No. 860,098. PATENTED JULY 16, 1907.
E. KROPAT.
TOOL.
APPLICATION FILED JAN. 29, 1907.
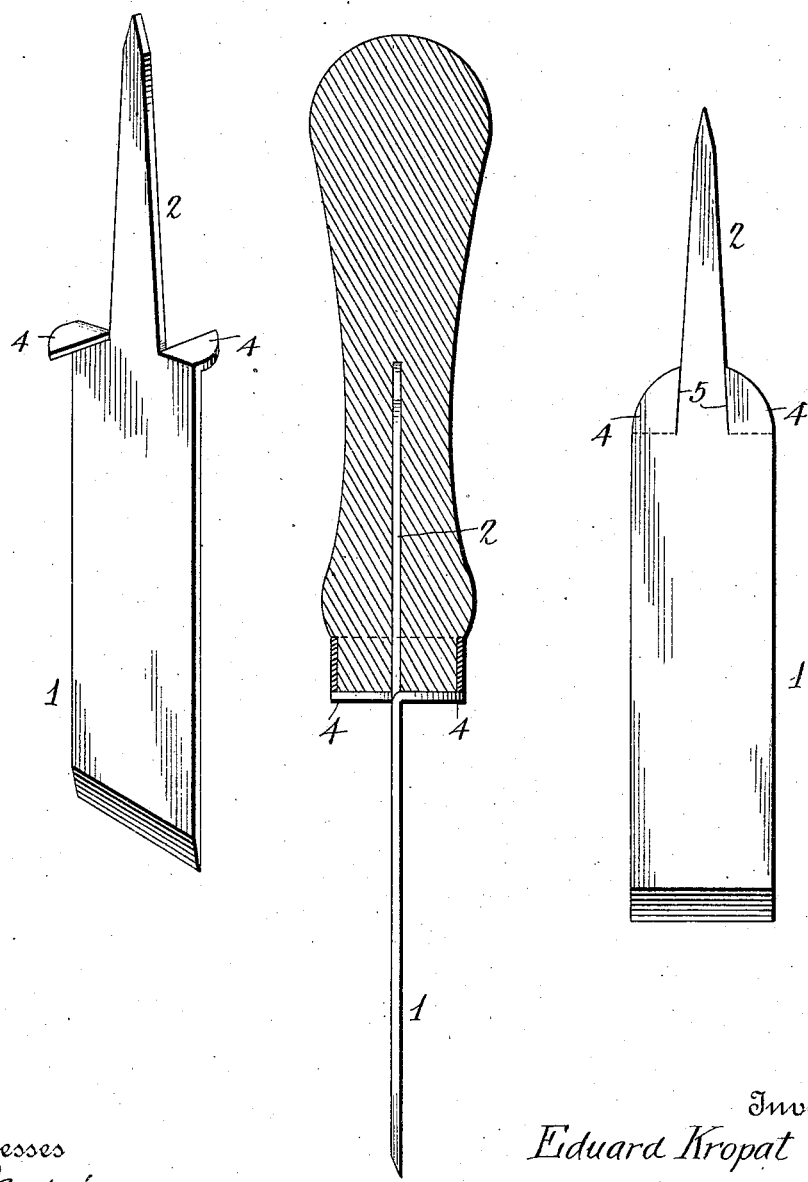
Witnesses
Inventor
Eduard Kropat
by Attorneys

UNITED STATES PATENT OFFICE.

EDUARD KROPAT, OF ROCHESTER, NEW YORK, ASSIGNOR OF ONE-HALF TO OTTO SCHINDLER, OF ROCHESTER, NEW YORK.

TOOL.

No. 860,098.　　　　　Specification of Letters Patent.　　　　Patented July 16, 1907.

Application filed January 29, 1907. Serial No. 354,777.

*To all whom it may concern:*

Be it known that I, EDUARD KROPAT, a citizen of the United States, residing at Rochester, in the county of Monroe and State of New York, have invented certain new and useful Improvements in Tools; and I do declare the following to be a full, clear, and exact description of the invention, such as will enable others skilled in the art to which it appertains to make and use the same.

My invention relates to improvements in tools, such as chisels, carvers' tools, screw-drivers and other like tools, in which there is a blade having at one end a shank to be driven into one end of a handle, and my said invention consists in a blade of such character provided with integral lugs extending in opposite directions therefrom at the base of the shank where the latter is united with the blade, said lugs being adapted to bear on the end of the handle and prevent the shank from being driven too deeply therein, as hereinafter described and claimed.

In the accompanying drawings,—Figure 1 is a perspective view of a tool blade provided with my improved lugs; Fig. 2 is an elevation of a tool, constructed in accordance with my invention, the handle being shown in section; and Fig. 3 is a plan view of the blank from which my improved tool is formed.

The blade 1 may be in the form of a blade of a chisel, a carver's tool, a metal-working tool of the same general character or of a screw-driver or other tool. At the inner end of the same is a shank 2, formed integral therewith to be driven into one end of a handle, which may be of the form shown in Fig. 3, or of any other suitable form. In accordance with my invention, the shank from which the tool is formed is made with integral lugs 4 at the base of the tool blade where it joins the shank and on opposite sides of the shank, the said lugs being united to the base of the tool blade and divided from the shank by kerfs 5. The lugs are then bent in opposite directions so as to cause them to project from opposite sides of the tool at right angles thereto, or substantially so, and forming shoulders which, when the shank is driven into the handle, will bear upon one end of the handle and prevent the shank from being driven too deeply thereinto.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention, as defined by the appended claims.

Having thus described my invention, what I claim as new, and desire to secure by Letters-Patent, is,—

A tool blade of the class described formed with an integral shank at one end to be driven into a handle, and provided at the opposite sides of the shank, at the point where the latter unites with the blade, with lugs integral with the blade and separated from the shank, said lugs being bent in opposite directions from the tool to bear against the end of the handle and prevent the shank from being driven too deeply thereinto.

In testimony whereof I have hereunto set my hand in presence of two subscribing witnesses.

EDUARD KROPAT.

Witnesses:
EDWARD C. EDELMAN,
JOHAN GLADE.